United States Patent Office 3,194,846
Patented July 13, 1965

3,194,846
STABILIZED CHLORINATED PARAFFIN WAX
Aurel Blaga, Syracuse, N.Y., assignor to Allied Chemical Corporation, New York, N.Y., a corporation of New York
No Drawing. Filed May 13, 1963, Ser. No. 280,123
5 Claims. (Cl. 260—652.5)

This invention relates to stabilized chlorinated paraffin waxes and more particularly to the stabilization of highly chlorinated paraffin waxes against the degradative action of heat and light.

Highly chlorinated paraffin waxes, particularly those containing between about 45% and about 80% by weight of chlorine may be prepared as known in the art by the chlorination of paraffin waxes or of mixtures of paraffin waxes and paraffin oils as by contacting the wax or wax-oil mixture with elemental chlorine either in the molten state, or dissolve in a solvent such as carbon tetrachloride.

Such highly chlorinated paraffin waxes are useful for a number of purposes, including the impregnation of substrates to render them fire retardant, and for blending with other resinous materials, pigments, fillers, etc., in the manufacture of sheeting and tiles suitable for use as floor and wall coverings.

The highly chlorinated paraffin waxes have been limited in uses in the past by their instability at elevated temperatures giving rise to loss of chlorine and to discoloration of the composition. In the past various stabilizers have been proposed for addition to the chlorinated paraffin waxes in an effort to improve their stability, including glycols such as ethylene glycol and epoxy compounds such as epichlorohydrin.

The prior art stabilizers have not proved entirely satisfactory for various reasons; for example, epichlorohydrin, one of the best of the prior art stabilizers, is not only relatively expensive, but it has such a low boiling point (117° C.) that considerable loss of stabilizer tends to take place on compounding with the paraffin wax at temperatures approaching the boiling point of this stabilizer. The glycols, on the other hand, are unsatisfactory because their addition, in even the small proportions required for stabilization, decreases the overall chlorine content of the stabilized wax, often by as much as about 0.6% and this in turn causes an exaggerated decrease in the softening point of the wax, sometimes by as much as 5° to 10° C., thus in many cases placing an otherwise satisfactory material outside the standard softening point specifications.

An object of the present invention is to provide stabilized chlorinated paraffin waxes of high chlorine contents.

In accordance with my invention a normally solid, highly chlorinated paraffin wax or normally solid chlorinated paraffin wax-paraffin oil mixture having from 45% to 80% combined chlorine by weight, preferably between about 50% and about 60% chlorine, is stabilized by the incorporation therein of a small proportion of a mono-chloro-monohydric alkanol of 2 to 3 carbon atoms, having the chlorine and the hydroxy groups on different carbon atoms.

Suitable chloroalkanols for use in my invention are 1-chloro-2-ethanol (ethylene chlorohydrin), 1-chloro-2-propanol (propylene chlorohydrin), 3-chloro-1-propanol (trimethylene chlorohydrin) and 2-chloro-1-propanol. Boiling points of these compounds are shown in Table I below.

TABLE I

Boiling points of monochloro alkanols

| Monochloro Alkanol: | Boiling Point, ° C. |
|---|---|
| 1-chloro-2-ethanol | 129 |
| 2-chloro-1-propanol | 133 |
| 3-chloro-1-propanol | 162 |
| 1-chloro-2-propanol | 127 |

The quantity of chloroalkanol used can be very small, even a fraction of a percent producing a stabilizing effect. Usually quantities between about 0.5% and about 2% based on the weight of the chlorinated paraffin wax are suitable.

Any chlorinated paraffin waxes of high chlorine content, i.e. between about 45% and about 80% chlorine may be stabilized in accordance with my invention. Particularly suitable are those chlorinated paraffin waxes obtained by chlorinating the so-called "soft" paraffin waxes, i.e. paraffin waxes having softening points between about 15° C. and about 60° C. These "soft waxes" include mixtures of paraffin waxes and paraffin oils of similar molecular weight. Thus they include "slack wax" as well as the so-called "soft waxes" or mixtures of slack wax and hydrocarbon oil. "Slack wax" is a crude form of paraffin wax and is the product directly obtained by filtration (dewaxing) of a chilled crude lube oil fraction. "Soft wax" is usually the by-product obtained in a solvent deoiling process which involves treating slack wax with a warm solvent, for example methylethyl ketone-toluene mixture, chilling the resultant system to 50° F. and filtering off the insoluble (high melting) paraffin wax. The filtrate, after being stripped of solvent, constitutes soft wax. This "soft wax" is similar in character to slack wax and is a wax-oil mixture with an oil content of about 35% to about 40%. Mixtures containing up to about 60% oil are suitable.

In carrying out my invention, the chlorinated paraffin wax and the chloroalkanol are mixed in any suitable manner, for example by adding the liquid chloroalkanol to molten chlorinated paraffin wax while agitating. Preferably the stabilizer is added immediately after completion of chlorination of the wax. However, if it is to be added to a solid chlorinated paraffin wax, and if melting of the chlorinated wax is undesirable, blending may be accomplished by working in the stabilizer on a heated roller mill.

The following specific examples illustrate the stabilizing effect of the chlorinated alkanols on a highly chlorinated paraffin wax. Parts are by weight.

EXAMPLES 1-4

Into 100 parts each of separate samples of chlorinated paraffin wax of 52% chlorine content, in molten state at 85–90° C., there was incorporated with stirring, 1 part of the chlorinated alkanols listed in the following table as stabilizers. Samples of each mixture were then poured into test tubes which were placed in an oil bath at 175°±0.5° C., and the time required for the chlorinated paraffin wax-chlorinated alkanol mixture to turn black was recorded. Results of the tests are recorded in Table II below.

TABLE II

| Example No. | Stabilizer | Time at 175° C. required for sample to turn black—minutes |
|---|---|---|
| 1 | None | 4.5 |
| 2 | 1-chloro-2-ethanol | 9.5 |
| 3 | 1-chloro-2-propanol | 7.5 |
| 4 | 3-chloro-1-propanol | 9.5 |

While the above illustrates the preferred embodiments of my invention, it will be understood that departures can be made therefrom within the scope of the specification and claims.

I claim:

1. A composition of matter comprising a chlorinated paraffin wax containing between about 45% and about 80% chlorine, and a stabilizing amount of a monochloromonohydric alkanol of 2 to 3 carbon atoms wherein the chlorine and hydroxy groups are attached to different carbon atoms.

2. The composition according to claim 1, wherein the chloroalkanol is 1-chloro-2-ethanol.

3. The composition according to claim 1, wherein the chloroalkanol is 1-chloro-2-propanol.

4. The composition according to claim 1, wherein the chloroalkanol is 3-chloro-1-propanol.

5. The composition according to claim 1, wherein the chlorinated paraffin wax contains from 45% to about 65% chlorine.

References Cited by the Examiner

UNITED STATES PATENTS 2,371,644  3/45  Petering et al. _____ 260—652.5
2,722,557  11/55  Danison _____ 260—652.5

LEON ZITVER, *Primary Examiner.*